(12) United States Patent
Zhao et al.

(10) Patent No.: US 9,167,322 B1
(45) Date of Patent: *Oct. 20, 2015

(54) OPTOELECTRONIC PACKET SWITCH/ROUTERS

(71) Applicant: Google Inc., Mountain View, CA (US)

(72) Inventors: Xiaoxue Zhao, Fremont, CA (US);
Bikash Koley, Sunnyvale, CA (US);
Vijay Vusirikala, Palo Alto, CA (US);
Edward Crabbe, San Francisco, CA (US); Paul Phillip Germano, San Francisco, CA (US); Hong Liu, Palo Alto, CA (US); Philip Michael Wells, Madison, WI (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/301,555

(22) Filed: Jun. 11, 2014

Related U.S. Application Data

(63) Continuation of application No. 13/552,774, filed on Jul. 19, 2012, now Pat. No. 8,792,787.

(51) Int. Cl.
*H04Q 11/00* (2006.01)
*H04B 10/2575* (2013.01)

(52) U.S. Cl.
CPC ....... *H04Q 11/0005* (2013.01); *H04B 10/2575* (2013.01); *H04Q 2011/0013* (2013.01)

(58) Field of Classification Search
None
See application file for complete search history.

(56) References Cited

U.S. PATENT DOCUMENTS

| 2003/0133641 | A1 | 7/2003 | Yoo |
| 2004/0136385 | A1 | 7/2004 | Xue et al. |
| 2008/0075460 | A1 | 3/2008 | Islam |
| 2012/0082454 | A1 | 4/2012 | Ooi |

OTHER PUBLICATIONS

"Device Requirements for Optical Interconnects to Silicon Chips," David Miller, Proceedings of the IEEE, vol. 97, No. 7, Jul. 2009.
"Advances in Silica Planar Lightwave Circuits," Christopher R. Doerr and Katsunari Okamoto, vol. 24, No. 12, Journal of Lightwave Technology, 2006.
"Large NxN Waveguide Grating Routers,"P.Bernasconi, et. al. vol. 18, No. 7, Journal of Lightwave Technology, 2000.

(Continued)

*Primary Examiner* — David Payne
*Assistant Examiner* — Casey Kretzer
(74) *Attorney, Agent, or Firm* — Honigman Miller Schwartz and Cohn LLP (57) ABSTRACT

A packet switch/router including a first stage switch fabric receiving an electrical signal, a mid-stage buffer receiving and storing the electrical signal from the first stage switch fabric, and a second stage switch fabric receiving the electrical signal from the mid-stage buffer. Each switch fabric includes N layers of NxN arrayed waveguide gratings (AWGs), and each AWG has ingress ports and egress ports. A wavelength tunable device, such as a tunable laser, communicates with a source ingress port of an AWG and converts the received electrical signal to an optical signal having a wavelength selected for routing a packet from the source ingress port to a target egress port of the arrayed waveguide grating. A photoreceiver, such as a burst-mode photoreceiver, receives the propagated optical signal from the target egress port and converts the optical signal to the electrical signal.

18 Claims, 6 Drawing Sheets

(56) References Cited

OTHER PUBLICATIONS

"Optical Packet and Burst Switching Technologies for the Future Photonic Internet," S. J. Ben Yoo, vol. 24, No. 12, Journal of Lightwave Technology, 2006.

"An Asynchronous, Variable Length Two-stage Packet Switch Fabric Architecture with Look-ahead and Load-balance Scheduling Schemes for Optical- Label Switching Networks," Haijun Yang, Globecom 2004.

"Ultrafast optoelectronic packet processing for asynchronous, optical packet-switched networks," R. Takahashi, et. al, vol. 3, No. 12, Journal of Optical Networking 2004 [9]"Low-Latency Pipelined Crossbar Arbitration," Cyriel Minkenberg, et. al. Globecom 2004.

"Sizing Router Buffers", Guido Appenzeller et. al., SIGCOMM 2004.

"Low-Latency Pipelined Crossbar Arbitration," Cyriel Minkenberg, et. al. Globecom 2004.

Office Action for related U.S. Appl. No. 13/552,774 dated Jan. 22, 2014.

OPTOELECTRONIC PACKET SWITCH/ROUTERS

CROSS REFERENCE TO RELATED APPLICATIONS

This U.S. patent application is a continuation of and claims priority under 35 U.S.C. §120 from, U.S. patent application Ser. No. 13/552,774, filed on Jul. 19, 2012, which is hereby incorporated by reference in its entirety.

TECHNICAL FIELD

This disclosure relates to optoelectronic packet switch/routers using multi-layer multi-stage array waveguide gratings.

BACKGROUND

The volume of data handled by network devices has increased dramatically over the past decade, resulting in significant challenges in terms of designing bigger and faster switches/routers to keep up with increasing bandwidth demands. The total off-chip bandwidth of the switching/routing chip C is the product of the total number of ports per chip R (referred to as the radix of the chip) and the per port speed B (C=R×B) Increasing the total off-chip bandwidth C requires increasing the radix of the chip R and/or the per port speed B. Flowever, there is a trade-off between these two parameters in terms of electronic integrated circuit (IC) design.

It is difficult to increase the total off-chip bandwidth C of an IC switching/routing chip. First, the length of on-chip interconnects generally governs the speed between ports. The smaller the size of the chip, the faster the speed the interconnects can support. Therefore, a smaller chip may be able to support higher port speeds, but only at the cost of lower port count due to the smaller chip area (and hence limited pin count; of which power supplies typically consume almost half of the pins). Second, the input/output (I/O) port power density typically does not scale with the transistor technology. Even if the transistor technology supports higher speed and lower power, the I/O power increases as the port speed increases. More effective on-chip equalization components are needed to drive signals across a reasonable length of the electrical transmission channels at higher speeds, each of which produces additional heat. Since there is a maximum heat dissipation capacity for a given die size, the port count is reduced to fit into the power envelope for increased per port speed. To avoid these issues and achieve higher switching capacity per node, one common practice is to connect multiple chips in a non-blocking fashion inside a chassis to form a node with a relatively larger aggregate switching capacity. However, this approach has its own limitations, as the distance over the chassis backplane's Printed Circuit Board (PCB) that a switch chip I/O can drive signals becomes shorter as the I/O rate increases. Another general practice is to interconnect multiple small chassis together in a non-blocking fashion to form a virtual chassis with larger switching capacity. This approach is the least integrated, hence the most expensive and power hungry because it represents a significant overhead in terms of packaging materials and interconnects between chassis, and also poses many challenges in terms of deployment and operations.

Arrayed waveguide gratings (AWGs) have been used as interconnection fabrics in all-optical routers and optical-electrical hybrid routers. A known implementation includes single AWG devices or two cascaded AWGs with optical label switching, all optical wavelength converter(s) and shared optical delay line buffers. This system is limited by the size of the AWG and is difficult to scale. In addition optical delay line buffers, which are typically very small, are generally insufficient to make the router of practical use. The two-stage cascaded design makes use of one AWG to solve packet contention rather than scaling up the port count. Other known implementations include four layers of 4×4 AWGs and shared CMOS RAM to provide a single stage design with multiple layers of AWGs; however, this design does not result in a non-blocking fabric, making the design inefficient and unappealing from a practical deployment perspective. This approach is also very difficult to scale due to the complexity and limitations of the shared RAM architecture.

SUMMARY

A hybrid optoelectronic switch/router architecture may overcome the total switching capacity barrier in electronic integrated circuits, while providing a relatively large capacity using commercially available components. One aspect of the disclosure provides a packet switch/router that includes a first stage switch fabric receiving an electrical signal, a mid-stage buffer receiving and storing the electrical signal from the first stage switch fabric, and a second stage switch fabric receiving the electrical signal from the mid-stage buffer. Each switch fabric includes N layers of N×N arrayed waveguide gratings (ANA/Gs), and each AWG has ingress ports and egress ports. A wavelength tunable device, such as a tunable laser, communicates with a source ingress port of an AWG and converts the received electrical signal to an optical signal having a wavelength selected for routing a packet from the source ingress port to a target egress port of the arrayed waveguide grating. A photoreceiver, such as a burst-mode photoreceiver, receives the propagated optical signal from the target egress port and converts the optical signal to the electrical signal.

Implementations of the disclosure may include one or more of the following features. In some implementations, the packet switch/router includes an interface, such as an optical transceiver, receiving an optical signal and converting the optical signal to the electrical signal received by the first stage switch fabric. The packet switch/router may include an input buffer receiving and storing the electrical signal from the interface. The input buffer communicates the electrical signal to the first stage switch fabric. Each switch stage fabric may be non-blocking and/or connected in a Clos network. In some examples, each switch stage fabric may include 100 layers of 100×100 arrayed waveguide gratings having a per port speed of about 10G, which work together with fast wavelength converters to steer the packets through the fabric. Such a system may achieve a total switching capacity of ~100 Tbps.

In some implementations, the packet switch/router includes a scheduler in communication with the interface, the input buffer, the mid-stage buffer, and wavelength tunable devices. The scheduler receives notification from the interface of a received packet on the electronic signal and issues steering instructions to the wavelength tunable devices for routing the packet from a source ingress port to a target egress port on each switch fabric. The scheduler may issue instructions in parallel to the first and second stage switch fabrics. The mid-stage buffer reduces scheduling speed requirements for the wavelength tunable devices by a factor of N and allows the scheduler to send routing instructions in parallel to the first and second switch fabrics.

Fast tunable lasers running at 10 Gbps as wavelength converters along with 10 Gbps burst-mode receivers and electronic buffers are practical and commercial components that can meet the technical specifications of the proposed architecture. In addition, by implementing mid-stage buffers, the scheduling speed requirement on the scheduler can be reduced by N times.

Another aspect of the disclosure provides a method of packet switching. The method includes receiving an electric signal, converting the electric signal to a first optical signal, and propagating the first optical signal through a first stage switch fabric. The first stage switch fabric includes N layers of N×N arrayed waveguide gratings, where each arrayed waveguide grating has ingress ports and egress ports. The first optical signal has a first wavelength that results in routing a packet from a source ingress port to a target egress port of an arrayed waveguide grating of the first stage switch fabric. The method also includes converting the first optical signal back to the electric signal, converting the electric signal to a second optical signal, and propagating the second optical signal through a second stage switch fabric. The second stage switch fabric includes N layers of N×N arrayed waveguide gratings, where each arrayed waveguide grating has ingress ports and egress ports. The second optical signal has a second wavelength that results in routing the packet from a source ingress port to a target egress port of an arrayed waveguide grating of the second stage switch fabric. The method includes converting the second optical signal back to the electric signal.

In some implementations, the method includes receiving an input optical signal and converting the input optical signal to the electrical signal. The method may include storing the electrical signal while waiting for instructions fir converting the electrical signal to the first optical signal having the first wavelength. Moreover, the method may include receiving routing instructions for converting the electrical signal to the first optical signal. After converting the first optical signal back to the electric signal, the method may include storing the electrical signal while waiting for instructions for converting the electrical signal to the second optical signal having the second wavelength. The method includes receiving routing instructions for converting the electrical signal to the second optical signal. In some examples, the method includes receiving in parallel routing instructions for converting the electrical signal to the first optical signal and routing instructions for converting the electrical signal to the second optical signal. The method may include converting the second optical signal back to the electric signal using a burst-mode photoreceiver.

The method may include connecting the first and second stage switch fabrics in a Clos network. Each switch fabric may include 100 layers of 100×100 arrayed waveguide gratings having a per port speed of about 10G.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
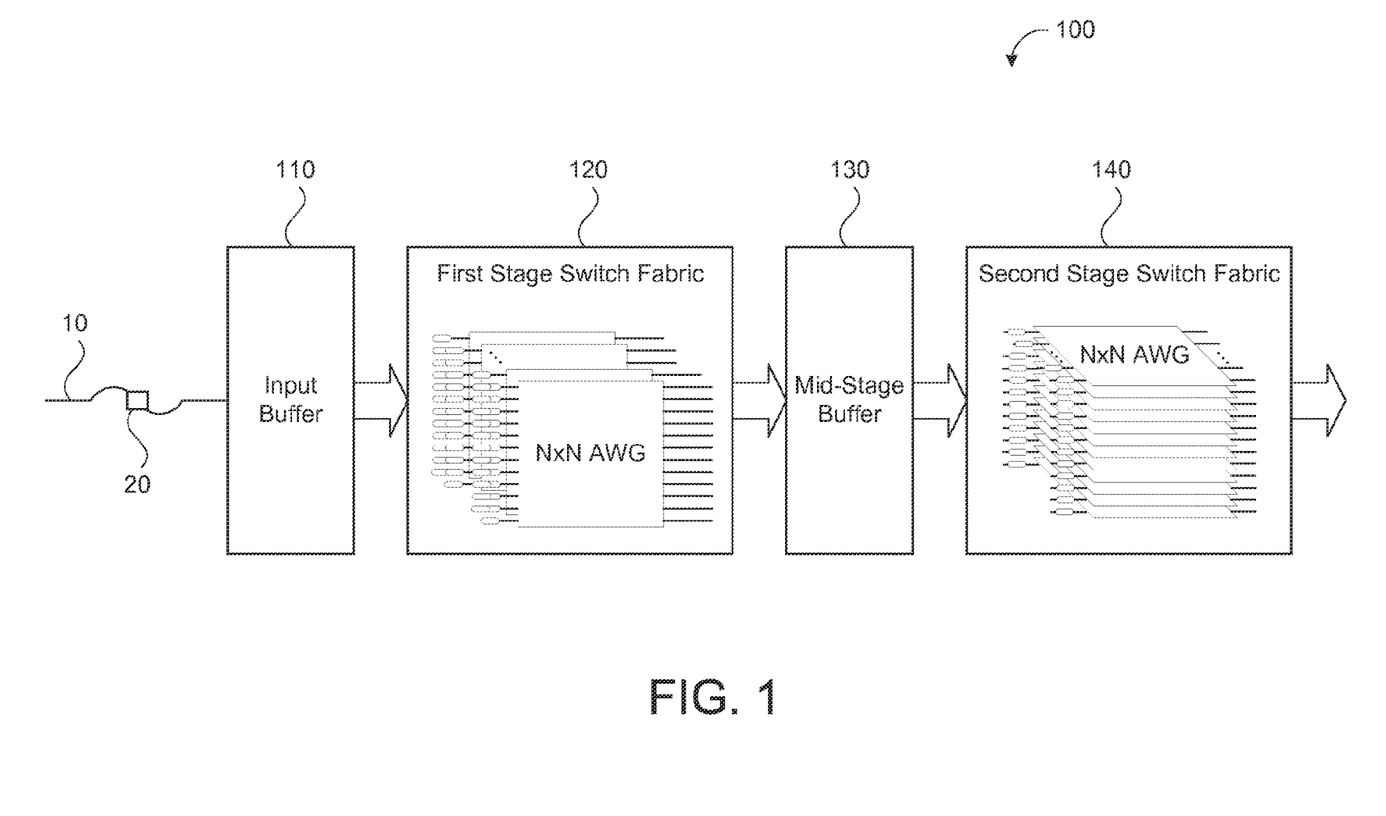
FIG. 1 is a schematic view of an exemplary packet switch/router.
Figure 2:
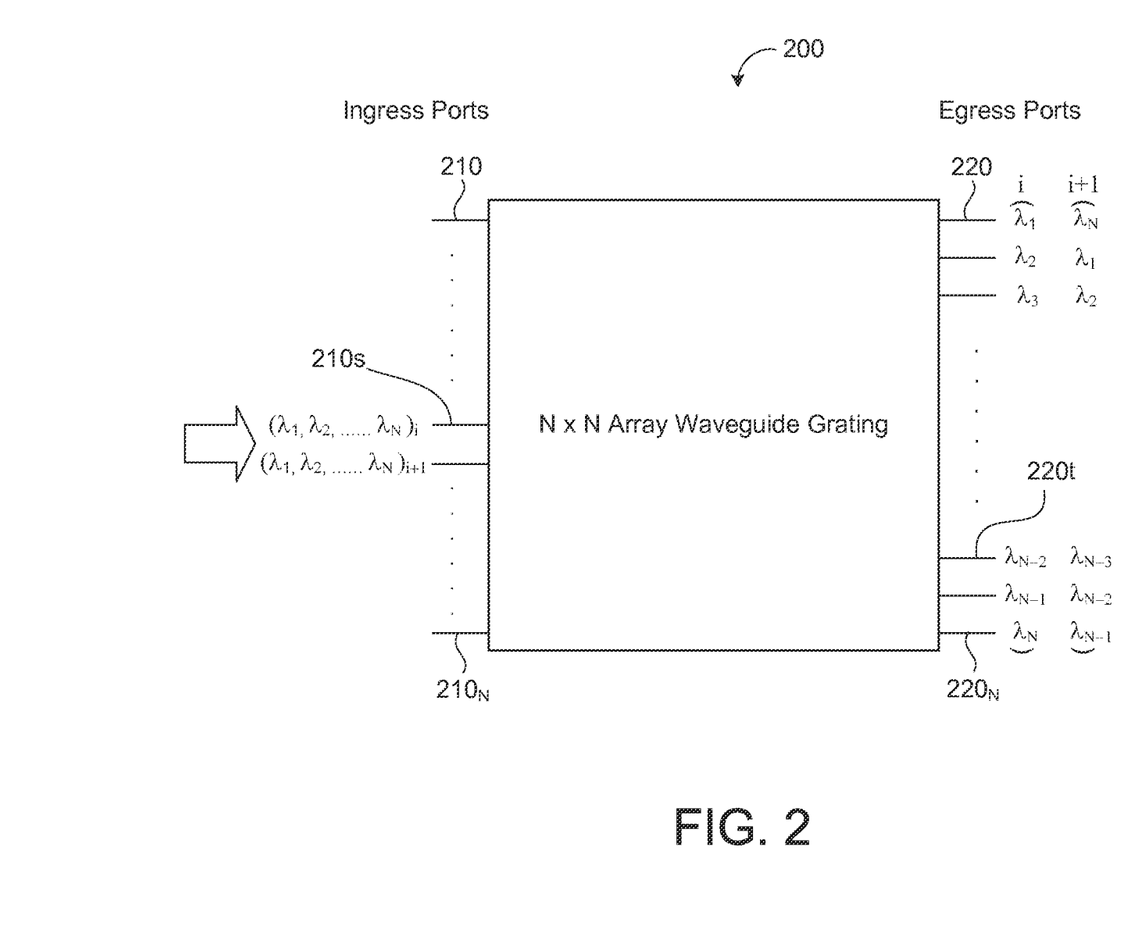
FIG. 2 is a schematic view of an exemplary arrayed waveguide grating.
Figure 3:
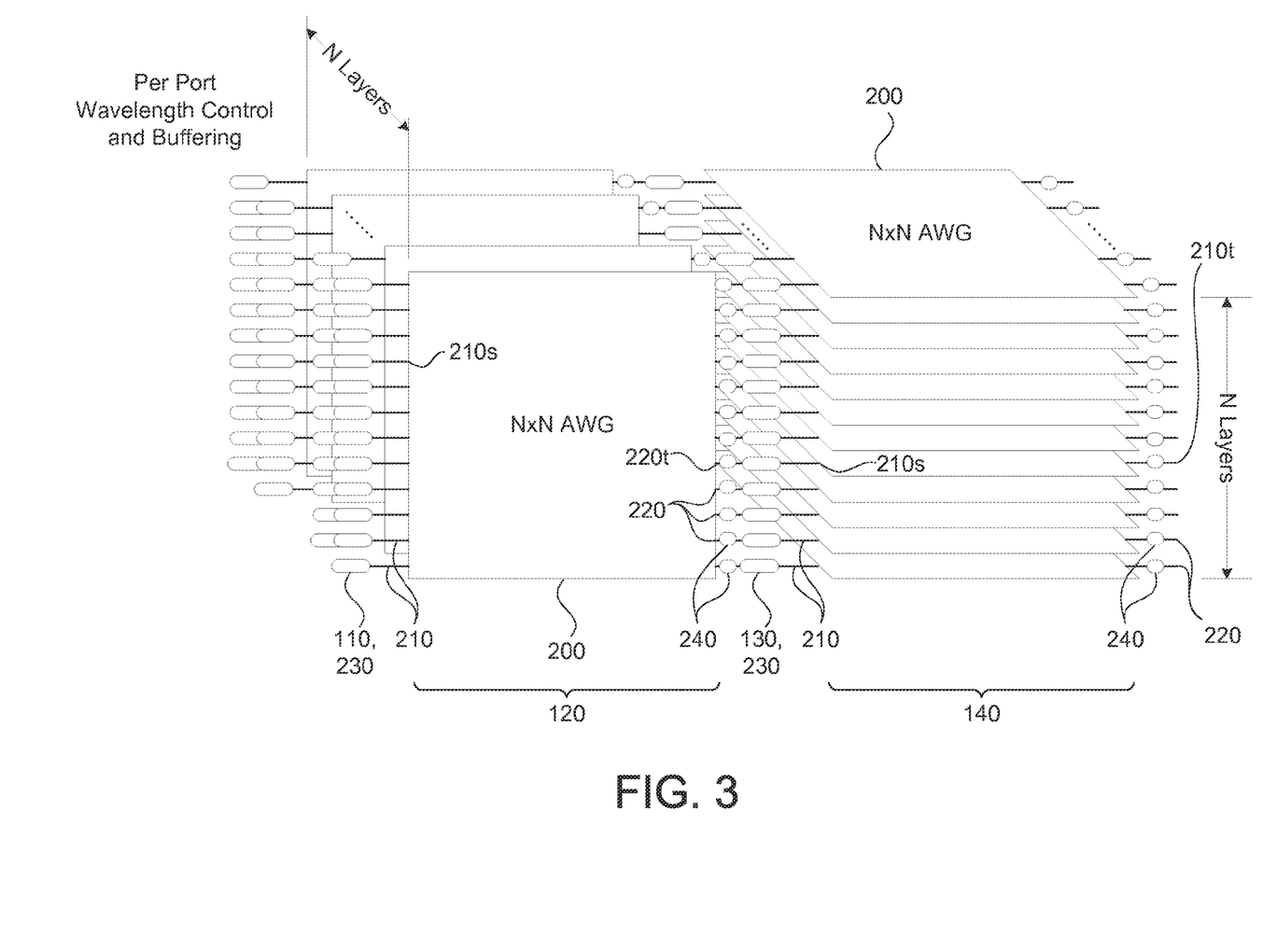
FIG. 3 is a schematic view of an exemplary a multi-stage packet switch/router.

Referring to FIGS. 1-3, in some implementations, a packet switch/router 100 has a hybrid optical and electrical architecture that can support a relatively large capacity, such as 100 Tbps. The packet switch/router 100 may include a first stage switch fabric 120 receiving an electrical signal 10, a mid-stage buffer 130 receiving and storing the electrical signal 10 from the first stage switch fabric 120, and a second stage switch fabric 140 receiving the electrical signal 10 from the mid-stage buffer 130. The packet switch/router 100 may include input buffer 110 for receiving and storing the electric signal 10 before delivery to the first stage switch fabric 120. Although only two switch fabric stages 120, 140 are shown, the packet switch/router 100 may include more than two switch fabric stages 120, 140, each with a mid-stage butter 130 in communication therebetween.

The packet switch/router 100 may use a combination of N×N arrayed waveguide gratings (AWGs) 200. By placing 2N layers of N×N AWGs 200 in the first and second stages 120, 140 one can achieve $N^2$ ports. An AWG 200 is a passive planar light wave circuit device typically used in optical networks as a wavelength multiplexer and/or demultiplexer. N×N AWGs 200 also have wavelength routing capabilities, as shown in FIG. 2. If a system has N equally-spaced wavelengths $\lambda_N$, an N×N AWG 200 can be designed with an egress port spacing matching the wavelength spacing. The N×N AWG 200 routes differing wavelengths at an ingress port 210 to different egress ports 220 such that all N wavelengths are mapped to all N egress ports $220_N$ sequentially. The routing of the same N wavelengths at two consecutive ingress ports 210 have the wavelength mapping shifted by one egress side, as shown in FIG. 2, which is noted as cyclic. Titus, the N×N AWG 200 can route any incoming packet 20 to desired egress ports 220 by controlling their wavelengths at the ingress port(s) 210 through a wavelength tunable device 230, such as a tunable laser (e.g., running at 10 Gbps). The wavelength tunable device, 230 communicates with a source ingress port 210s of an AWG 200 and converts the received electrical signal 10 to an optical signal 10 having a wavelength $\lambda$ selected for routing a packet 20 from the source ingress port 210s to a target egress port 220t of the AWG 200. A photoreceiver 240, such as a burst-mode photoreceiver, receives the propagated optical signal 10 from the target egress port 220t and converts the optical signal 10 to the electrical signal 10.

Using a symmetric N×N AWG 200 alone may pose a limitation on the total switching capacity. Per port speed is limited by tunable lasers 230 at the ingress ports 210 and burst-mode photoreceivers 240 at the egress ports 220. Moreover, it may only be practical to find cost-effective components with a relatively fast response time ns to be able to process each packet 20) at 10 Gbit speeds. An AWG 200 can be fabricated as a 100×100-port device with 50 GHz spacing. Currently, fabricating an N×N AWG with N>100 with concomitantly narrower wavelength spacing is very challenging due to the diffraction limit of the grating design. As a result, the current maximum switching capacity of a single AWG is about 1 Tbps, which is comparable to a commercial Silicon IC chip at the present moment.

Referring to FIG. 3, in some implementations, the packet switch/router 100 may include multiple stages 120, 140 with N AWGs 200 in each stage 120, 140. The multi-stage architecture increases a switching capacity by a factor of N. In the example shown, the packet switch/router 100 includes first and second stages 120, 140; however, many stages are possible. The first and second stages 120, 140 each include N layers of N×N AWGs 200. Although shown in a perpendicular (vertical and horizontal) arrangement, any orientation is possible, as needed for the fabrication. The egress ports 220 of the N layers of N×N AWGs 200 of the first stage 120 communicate with (e.g., connect to) the ingress ports 210 of the N layers of N×N AWGs 200 of the second stage 140, where each stage has exactly $N^2$ ingress ports 210 and $N^2$ egress ports 220.

Figure 4:
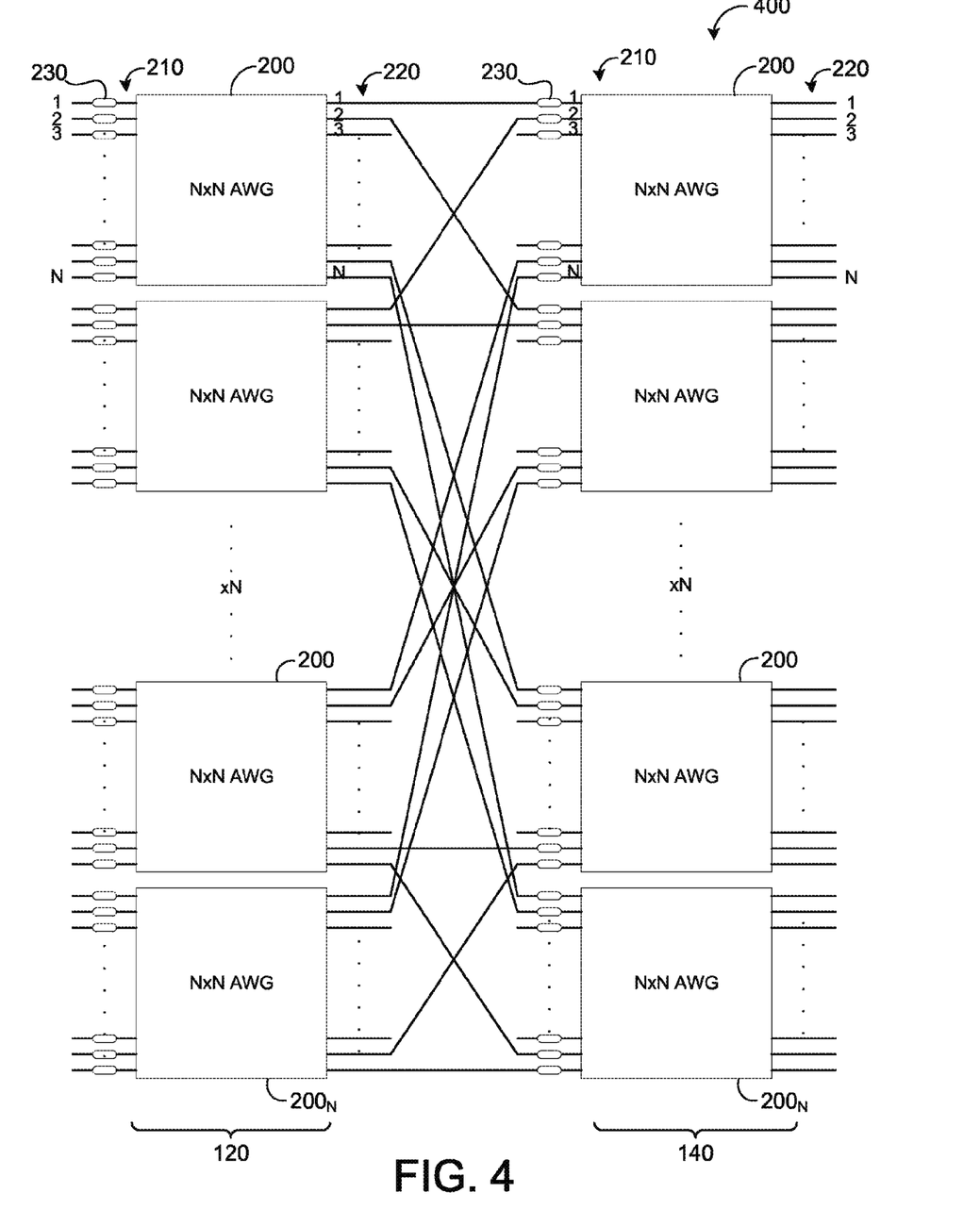
FIG. 4 is a schematic view of an exemplary Clos network.

Referring to FIG. 4, in some implementations, the stages 120, 140 are connected in a Clos network 400 (e.g., a two-stage Clos network for two stages). Each ingress port 210 of each AWG 200 may have a wavelength control device 230, such as a tunable laser or a wavelength converter, and packet buffers 110, 130. This configuration generates a non-blocking $N^2 \times N^2$ switch fabric 120, 140 because any packet 20 at any one of the $N^2$ ingress port can be routed through the first-stage AWG 200 to a desired second stage AWG 200, and then routed through the second-stage AWG 200 to a desired egress port 220. If the per port speed is B, then the total capacity becomes $B \times N^2$ with the use of 2N AWGs 200, which compares to a capacity of $B \times N$ for one AWG 200.

Figure 5:
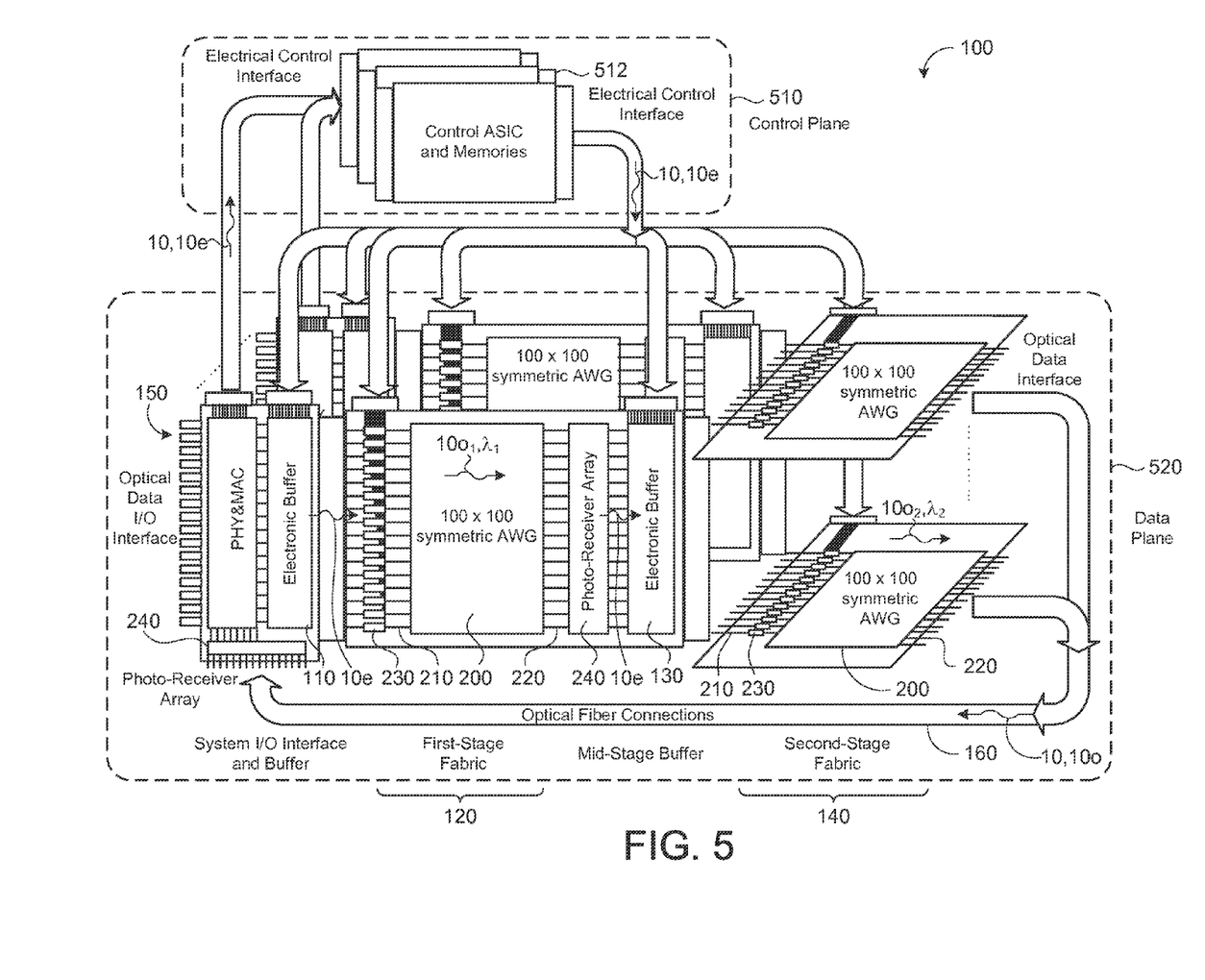
FIG. 5 is a schematic view of an exemplary packet switch/router.

Referring to FIG. 5, in some implementations, the packet switch/router 100 includes a control plane 510 and a data plane 520, providing a separation between managing packet routes and routing the packets 20. The control plane 510 may operate in the electrical domain. In some examples, the control plane 510 includes a scheduler 512 (e.g., an ASIC, FPGA or NPU) to schedule packet routing and configure the wavelengths $\lambda_N$ at each port 210, 220. The data plane 520 may operate at least primarily in the optical domain using the multi-stage non-blocking N×N AWG based optical switching fabric 120, 140. The data plane 520 may include electronic buffers 110, 130 (e.g., when well sized optical buffers 110, 130 are not practical or realizable).

The relatively small buffer solution may perform well when traffic arriving at the switch 100 is 1) well aggregated and 2) multiplexed with a relatively very low level of burstiness, a set of preconditions which are frequently not realized in the real world, the former being a characteristic of a network's topology and demand and the latter being difficult to achieve without very sophisticated flow/admission control.

The scheduler 512 may communicate with an I/O interface 150, the input buffer 110, the mid-stage buffer 130, and the wavelength tunable devices 230. The scheduler 510 receives notification from the interface 150 of a received packet 20 on the electronic signal and issues steering instructions to the wavelength tunable devices 230 for routing the packet 20 from a source ingress port 210s to a target egress port 220t on each switch fabric 120, 140. The scheduler 512 may issue instructions in parallel to the first and second stage switch fabrics 120, 140.

The data plane 520 can be separated into the following four logical blocks architecturally: (a) system I/O interface 150 and input buffer 110, (b) first-stage fabric 120, (c) mid-stage buffer 130, and (d) second-stage fabric 140. The system I/O interface 150 and the electrical buffer 110 interconnect the packet switch/router 100 with other switches, servers or transponders. The front panel I/O interfaces 150 can be optical transceiver modules that convert optical signals 10e to electrical signals 10e and then send the signals 10e to both the control plane 510 and the data plane 520. The control plane 510 takes the signal 10e and examines a packet header to determine how to route a corresponding packet 20 through the fabric to a target egress port 220, 220t by setting up the wavelength tunable devices 230—fast tunable lasers—at the ingress port 210 of each AWG 200.

The input buffer 110 first receives the signal 10e to the data plane 520 while waiting for the control plane 510 to determine how to steer the signal 10, 10e, 10o through the first-stage fabric 120, which includes N layers of MN AWGs 200. After receiving control plane instructions/results, the input buffer 110 sends the packet 20 to the wavelength tunable device 230 at the ingress port 210, 210s, which converts the electrical signal 10e to a first optical signal $10o_1$ with a first wavelength $\lambda_1$ based on the information from the control plane 510 for routing the packet 20 to a target egress port 220, 220t of the first stage 120. A photoreceiver 240 receives the packet 20 from the first stage egress port 220 and converts the first optical signal $10o_1$ back to an electrical signal 10e.

The mid-stage buffer 130 stores the electrical signal 10e before it is sent to the second switch fabric stage 140. The mid-stage buffers 130 reduce the scheduling speed requirement on the control plane 510 by a factor of N (e.g., by a factor of 100 for 100×100 AWGs). The scheduling speed is determined by data rate/packet size×header size per packet×number of ports (e.g., scheduling speed=(10 Gbps)/(1000 Bytes)×(10 Bytes)×number of ports). The mid-stage buffer 130 allows the scheduler 512 to work on one switch fabric stage 120, 140 instead of all switch fabric stages 120, 140 at the same time. As a result, the scheduler 512 only needs to handle N ports 210 with mid-stage buffers 130 versus $N^2$ ports without the mid-stage buffers 130, reducing the control plane speed requirement by a factor of N. The mid-stage buffer 130 may receive instructions from the scheduler 512 for converting the stored electrical signal 10e to a second optical signal $10o_2$ having a second wavelength $\lambda_2$ using the wavelength tunable device 230, such as a tunable laser.

The AWGs 200 of the second switch fabric stage 140 route the packets 20 to their final egress ports 220 by setting up the second stage wavelength tunable devices 230 attached to the ingress ports 210 second stage AWGs 200 correct wavelengths $\lambda$ in response to control plane results. The optical signal 10o at the egress ports 220 of the second switch fabric stage 140 then gets fed back to the system I/O interface 150 through optical fibers 160 and photoreceivers 240. When the wavelength tunable device 230 (e.g., fast tunable laser) switches from one wavelength $\lambda$ to another, there may be no signal 10 during the switching period before the new wavelength $\lambda$ gets stabilized. Although the switching time is very fast and likely approximately 1ns, this may require burst-mode photo-receivers 240 (e.g., operating at 10 Gbps) at the egress ports 220 of each AWG 200. Since this is an input-buffered system, existing scheduling algorithms published for input-buffered systems with virtual output queues (VOQs) can be used.

Figure 6:
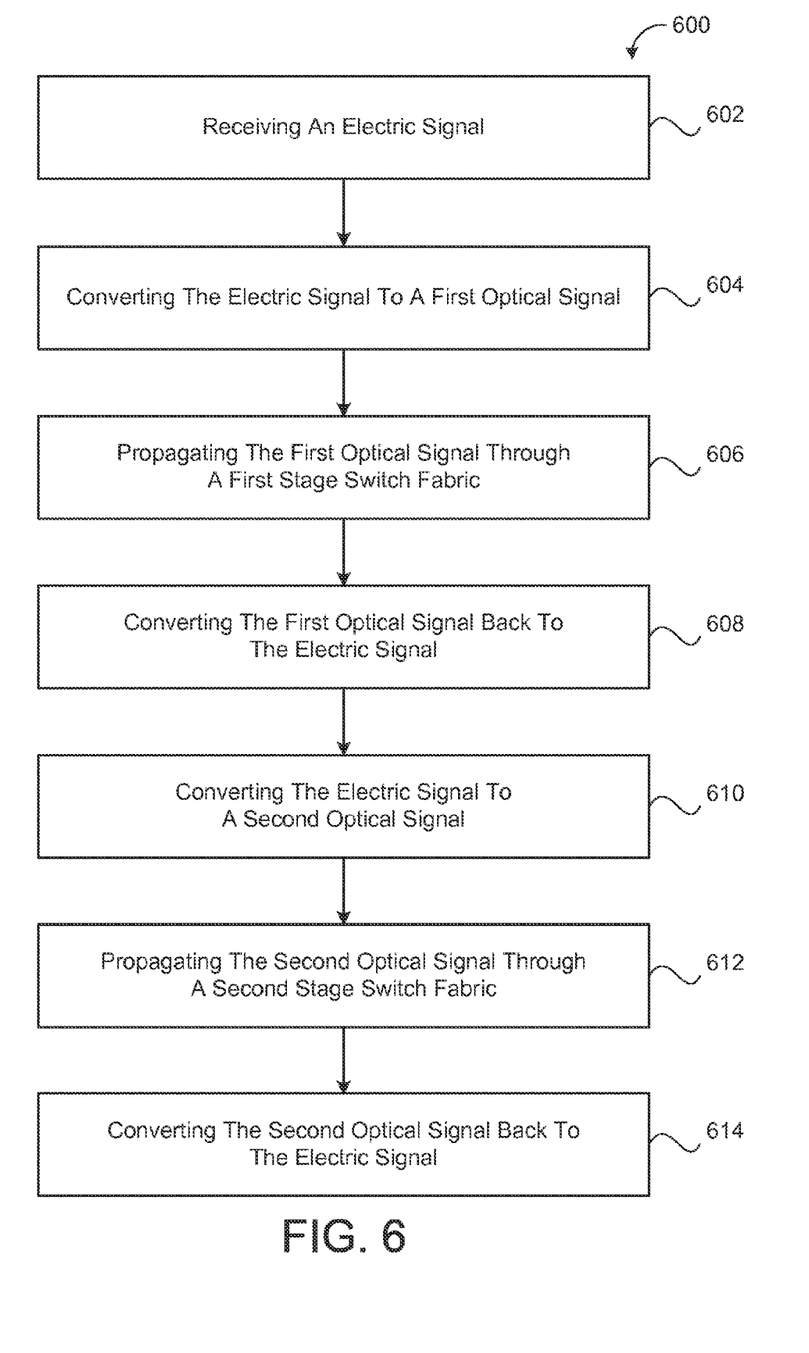
FIG. 6 is a schematic view of an exemplary arrangement of operations for a method of packet switching.

FIG. 6 provides an exemplary arrangement of operations for a method of packet switching. The method includes receiving 602 an electric signal 10, converting 604 the electric signal 10, 10e to a first optical signal $10o_1$, and propagating 606 the first optical signal $10o_1$ through a first stage switch fabric 120. The first stage switch fabric 120 includes N layers of N×N arrayed waveguide gratings (AWGs) 200, where each AWG 200 has ingress ports 210 and egress ports 220. The first optical signal $10o_1$ has a first wavelength $\lambda_1$ that results in routing a packet 20 from a source ingress port 210s to a target egress port 220t of an AWG 200 of the first stage switch fabric 120. The method also includes converting 608 the first optical signal $10o_1$ back to the electric signal 10e, converting 610 the electric signal 10e to a second optical signal $10o_2$, and propagating 612 the second optical signal $10o_2$ through a second stage switch fabric 140. The second stage switch fabric 140 includes N layers of N×N AWGs 200, where each AWG 200 has ingress ports 210 and egress ports 220. The second optical signal $10o_2$ has a second wavelength $\lambda_2$ that results in routing the packet 20 from a source ingress port 210s to a target egress port 220t of an AWG 200 of the second stage switch fabric 140. The method includes converting 614 the second optical signal $10o_2$ back to the electric signal 10e.

In some implementations, the method includes receiving an input optical signal 10 and converting the input optical signal 10 to the electrical signal 10e. The method may include storing the electrical signal 10e (e.g., in the input buffer 110) while waiting for instructions (e.g., from the scheduler 512) for converting the electrical signal 10e to the first optical signal $10o_1$ having the first wavelength $\lambda_1$. Moreover, the method may include receiving routing instructions (e.g., from the scheduler 512) for converting the electrical signal 10e to the first optical signal $10o_1$. After converting the first optical signal 10o back to the electric signal 10e, the method may include storing the electrical signal 10e (e.g., in the mid-stage buffer 130) while waiting for instructions (e.g., from the scheduler 512) for converting the electrical signal 10e to the second optical signal $10o_2$ having the second wavelength $\lambda_2$ (e.g., using a wavelength tunable device 230, such as a tunable laser). The method includes receiving routing instructions (e.g., from the scheduler 512) for converting the electrical signal 10e to the second optical signal $10o_2$. In some examples, the method includes receiving in parallel (e.g., from the scheduler 512) routing instructions for converting the electrical signal 10e to the first optical signal $10o_1$ and routing instructions fir converting the electrical signal 10e to the second optical signal $10o_2$. The method may include converting the second optical signal $10o_2$ back to the electric signal 10e using a burst-mode photoreceiver 240.

The method may include connecting the first and second stage switch fabrics 120, 140 in a Clos network 400. Each switch fabric 120, 140 may include 100 layers of 100×100 arrayed waveguide gratings 200.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-pee networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, hut rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly; other implementations are within the scope of the following claims.

What is claimed is:

1. A packet switch comprising:
a first stage switch fabric receiving an electrical signal;
a non-transitory mid-stage buffer receiving and storing the electrical signal from the first stage switch fabric; and
a second stage switch fabric receiving the electrical signal from the non-transitory mid-stage buffer, wherein each switch fabric comprises:
N layers of N×N arrayed waveguide gratings, each arrayed waveguide grating having ingress ports and egress ports;
a wavelength tunable device in communication with a source ingress port of an arrayed waveguide grating, the wavelength tunable device converting the received electrical signal to an optical signal having a wavelength selected for routing a packet from the source ingress port to a target egress port of the arrayed waveguide grating; and
a photoreceiver receiving the propagated optical signal from the target egress port and converting the optical signal to the electrical signal; and
a scheduler in communication with the wavelength tunable devices, the scheduler configured to receive a notification of a received packet and issue routing instructions to the wavelength tunable devices for routing the packet from a source ingress port to a target egress port on each switch fabric.

2. The packet switch of claim 1, further comprising an interface receiving an optical signal and converting the optical signal to the electrical signal received by the first stage switch fabric.

3. The packet switch of claim 2, wherein the interface comprises an optical transceiver.

4. The packet switch of claim 2, further comprising a non-transitory input buffer receiving and storing the electrical signal from the interface, the non-transitory input buffer communicating the electrical signal to the first stage switch fabric.

5. The packet switch of claim 4, wherein the scheduler receives the notification from the interface of a.

6. The packet switch of claim 5, wherein the scheduler issues instructions in parallel to the first and second stage switch fabrics.

7. The packet switch of claim 1, wherein the photoreceiver comprises a burst-mode photoreceiver.

8. The packet switch of claim 1, wherein each switch stage fabric is connect in a Clos network.

9. The packet switch of claim 1, wherein the wavelength tunable device comprises a tunable laser.

10. The packet switch of claim 1, wherein each switch stage fabric comprises 100 layers of 100×100 arrayed waveguide gratings having a per port speed of about 10G.

11. A method of packet switching, the method comprising:
receiving an electric signal;
receiving a notification of a received packet on the electronic signal;
determining routing instructions for the packet;
converting the electric signal to a first optical signal based on the routing instructions;
propagating the first optical signal through a first stage switch fabric, the first stage switch fabric comprising N layers of N×N arrayed waveguide gratings, each arrayed waveguide grating having ingress ports and egress ports, the first optical signal having a first wavelength that results in routing the packet from a source ingress port to a target egress port of an arrayed waveguide grating of the first stage switch fabric;
converting the first optical signal back to the electric signal;
after converting the first optical signal back to the electric signal, storing the electrical signal in a non-transitory mid-stage buffer;
converting the electric signal to a second optical signal based on the routing instructions;
propagating the second optical signal through a second stage switch fabric, the second stage switch fabric comprising N layers of N×N arrayed waveguide gratings, each arrayed waveguide grating having ingress ports and egress ports, the second optical signal having a second wavelength that results in routing the packet from a source ingress port to a target egress port of an arrayed waveguide grating of the second stage switch fabric; and
converting the second optical signal back to the electric signal.

12. The method of claim 11, further comprising receiving an input optical signal and converting the input optical signal to the electrical signal.

13. The method of claim 12, further comprising storing the electrical signal while waiting for instructions for converting the electrical signal to the first optical signal having the first wavelength.

14. The method of claim 11, further comprising, after converting the first optical signal back to the electric signal, storing the electrical signal while waiting for instructions for converting the electrical signal to the second optical signal having the second wavelength.

15. The method of claim 11, further comprising receiving in parallel routing instructions for converting the electrical signal to the first optical signal and routing instructions for converting the electrical signal to the second optical signal.

16. The method of claim 11, further comprising converting the second optical signal back to the electric signal using a burst-mode photoreceiver.

17. The method of claim 11, further comprising connecting the first and second stage switch fabrics in a Clos network.

18. The method of claim 11, wherein each switch fabric comprises 100 layers of 100×100 arrayed waveguide gratings having a per port speed of about 10G.

* * * * *

UNITED STATES PATENT AND TRADEMARK OFFICE
CERTIFICATE OF CORRECTION

PATENT NO. : 9,167,322 B1
APPLICATION NO. : 14/301555
DATED : October 20, 2015
INVENTOR(S) : Xiaoxue Zhao et al.

It is certified that error appears in the above-identified patent and that said Letters Patent is hereby corrected as shown below:

IN THE CLAIMS
At column 10, claim number 5, line number 60, please delete "of a"

Signed and Sealed this
Twenty-ninth Day of March, 2016

Michelle K. Lee
*Director of the United States Patent and Trademark Office*